United States Patent [19]

Tomidokoro

[11] Patent Number: 4,614,414
[45] Date of Patent: Sep. 30, 1986

[54] DARK SLIDE LOCKING SYSTEM FOR FILM HOLDER

[75] Inventor: Kanji Tomidokoro, Tokyo, Japan
[73] Assignee: Komamura Photographic Co., Ltd., Osaka, Japan
[21] Appl. No.: 721,446
[22] Filed: Apr. 9, 1985
[51] Int. Cl.⁴ .............................................. G03B 17/26
[52] U.S. Cl. .................................................... 354/284
[58] Field of Search ................................ 354/276–285

[56] References Cited
U.S. PATENT DOCUMENTS 2,946,271 7/1960 Craig .................................... 354/284
3,091,168 5/1963 Craig .................................... 354/284
4,204,724 5/1980 Bauer et al. ......................... 354/281

Primary Examiner—Donald A. Griffin
Attorney, Agent, or Firm—Birch, Stewart, Kolasch & Birch

[57] ABSTRACT

Dark slides are insertable in a film holder. Each dark slide has engaging portions formed at its opposite ends of the upper edge of the dark slide. Sliding members are provided for sliding movement along the upper edge of the dark slide. Each sliding member has a locking portion at one end. A spring is provided for biasing the slide member to cause the sliding member to resiliently lock the dark slide.

1 Claim, 3 Drawing Figures

DARK SLIDE LOCKING SYSTEM FOR FILM HOLDER

BACKGROUND OF THE INVENTION

1. Field of the Invention

The present invention relates to an improved dark slide locking system for a photographic film holder, which is adapted to prevent a dark slide from undesired sliding out when it is in an inserted state.

2. Description of the Prior Art

In conventional locking systems of this type, a rotatable stopper which has its upper end bent is mounted on the body of a film holder near a dark slide inserting opening thereof to lock the upper end of a dark slide by the bent portion of the stopper. However, the conventional locking systems are accompanied by disadvantages. Because the stopper is freely rotatable, it may rotate during the handling of the film holder, for example, in attaching the film holder and putting it in a box, so that the stopper may disengage from the end edge of the dark slide, allowing the dark slide to slide out. In this manner, the conventional locking system has no reliability.

SUMMARY OF THE INVENTION

It is therefore an object of the present invention to provide a dark slide locking system for film holders wherein a spring biased member is utilized to reliably lock a dark slide.

This object is accomplished by a dark slide locking system for film holder which comprises: a film holder, at least one dark slide insertable in the film holder, each dark slide having engaging portions formed at opposite ends of the upper edge of the dark slide, at least one sliding member provided for sliding movement along the upper edge of the dark slide, each sliding member having a locking portion at one end, and means for biasing the sliding member to cause the sliding member to resiliently lock the dark slide in place.

According to the present invention, the engaging portions are formed respectively at the opposite ends of the upper edge of the dark slide as described above. Therefore, the dark slide has flat surfaces and no projection. Thus, even if the dark slide is pulled out and put on another one, it is stable. Further, the engaging portions have a high mechanical strength and therefore, reliability of engagement is improved.

BRIEF DESCRIPTION OF THE DRAWINGS

The above and other objects of the invention will become apparent from the following description taken in conjunction with the accompanying drawings in which.

DESCRIPTION OF THE PREFERRED EMBODIMENT

Figure 1:
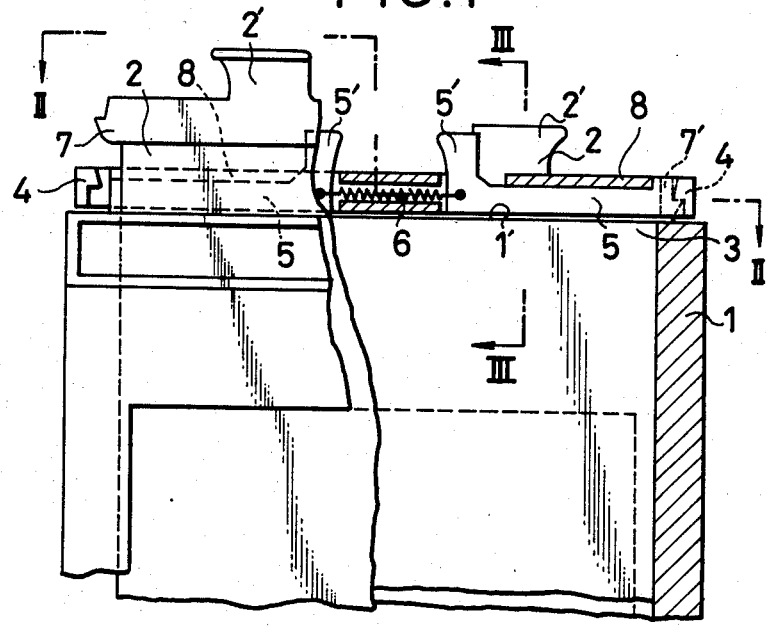
FIG. 1 is a partially cut-away front view of a film holder for illustrating a dark slide locking system of an embodiment according to the present invention.
Figure 2:
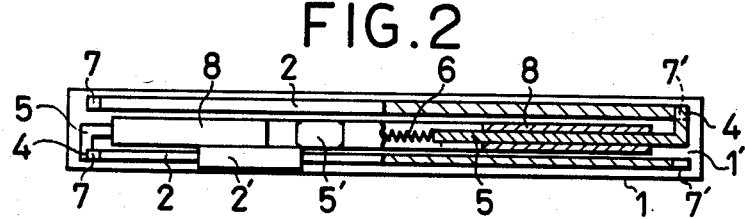
FIG. 2 is a plan view taken in the direction of the line II—II of FIG. 1.
Figure 3:
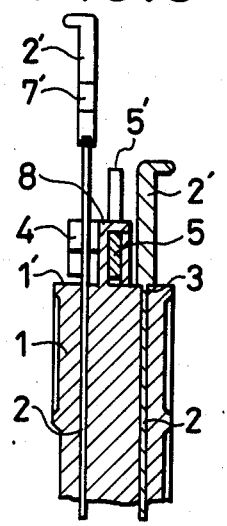
FIG. 3 is an enlarged sectional view taken along the line III—III of FIG. 1.

Referring to FIGS. 1 to 3, there is shown a double-sided film holder, but it will be understood that a single-sided film holder is also contemplated by the present invention. The film holder includes a body 1. A sliding member 5 is provided on the top surface 1' of the body 1, i.e., on the surface in which an opening 3 is provided for inserting a dark slide 2 therethrough. The sliding member 5 includes a locking portion 4 formed at its fore end, and is biased by means of a spring 6 in such a direction that the locking portion 4 is engaged with an engaging portion 7 or 7' of the dark slide, described later. The dark slide has a relatively thick upper edge portion of a high strength and the upper edge is formed at its opposite ends with engaging portions 7 and 7'.

In an unused state as shown in FIG. 1, one engaging portion 7' of the dark slide 2 is in engagement with the locking portion 4 of the sliding member 5 and hence, the dark slide 2 can not be pulled out.

When the film holder 1 has been loaded in a camera and the dark slide 2 is to be pulled out, a push portion 5' of the sliding member 5 is pushed against the force of the spring 6 to disengage the locking portion 4 from the engaging portion 7'. Thereupon, the dark slide 2 can be easily pulled out using a knob 2'. This operation is accomplished by holding the knob by the thumb and the third finger while pushing the push portion 5' with the forefinger so that it is possible to pull the dark slide 2 upwards. After photographing, the dark slide 2 is turned around and inserted through the inserting opening whereupon it conventionally and perfectly intercepts the light. Consequently, the other engaging portion 7 is engaged with the locking portion 4 to lock the dark slide 2 in the film holder 1.

In the double-sided film holder of this embodiment, the sliding members 5 and 5' are biased toward each other by means of the spring 6, and the locking portion 7 and 7' are formed symmetrically. The sliding members 5 and 5' are adapted to slide in a guide 8 provided on the body 1, for example, as shown in the Figures.

What is claimed is:

1. A dark slide locking system for film holder which comprises: a film holder, at least one dark slide insertable in the film holder, each dark slide having engaging portions formed at opposite ends of the upper edge of the dark slide, at least one sliding member provided for sliding movement along the upper edge of the dark slide, each sliding member having a locking portion at one end, and means for biasing the sliding member to cause the sliding member to resiliently lock the dark slide.

* * * * *